(12) United States Patent
Petrenko et al.

(10) Patent No.: US 7,038,125 B2
(45) Date of Patent: May 2, 2006

(54) LOW-FREQUENCY DE-ICING OF CABLEWAYS

(76) Inventors: Victor F. Petrenko, 4 Woodland Dr., Lebanon, NH (US) 03766; Charles R. Sullivan, 4 Burton Rd., Hanover, NH (US) 03755

( * ) Notice: Subject to any disclaimer, the term of this patent is extended or adjusted under 35 U.S.C. 154(b) by 479 days.

(21) Appl. No.: 10/056,163

(22) Filed: Jan. 24, 2002

(65) Prior Publication Data

US 2002/0118550 A1  Aug. 29, 2002

Related U.S. Application Data

(60) Continuation-in-part of application No. PCT/US02/01858, filed on Jan. 22, 2002, and a continuation-in-part of application No. 09/914,817, filed as application No. PCT/US00/05665 on Mar. 1, 2000, now Pat. No. 6,653,598, and a continuation-in-part of application No. PCT/US99/28330, filed on Nov. 30, 1999, which is a continuation-in-part of application No. 09/426,685, filed on Oct. 25, 1999, now Pat. No. 6,563,053, which is a division of application No. 09/094,779, filed on Jun. 15, 1998, now Pat. No. 6,027,075.

(60) Provisional application No. 60/263,943, filed on Jan. 24, 2001, provisional application No. 60/131,082, filed on Apr. 26, 1999, provisional application No. 60/122,463, filed on Mar. 1, 1999, and provisional application No. 60/110,440, filed on Dec. 1, 1998.

(51) Int. Cl.
*H02G 7/00* (2006.01)

(52) U.S. Cl. .................................................. 174/40 R
(58) Field of Classification Search ............... 174/40 R, 174/36, 74 R, 84 R, 40 TR, 40 TD
See application file for complete search history.

(56) References Cited

U.S. PATENT DOCUMENTS

| | | | | | |
|---|---|---|---|---|---|
| 2,797,344 | A | * | 6/1957 | Peirce | 307/147 |
| 2,870,311 | A | * | 1/1959 | Greenfield et al. | 174/102 R |
| 4,082,962 | A | * | 4/1978 | Burgsdorf et al. | 307/147 |
| 4,085,338 | A | * | 4/1978 | Genrikh et al. | 307/147 |
| 4,119,866 | A | * | 10/1978 | Genrikh et al. | 307/147 |
| 4,135,221 | A | * | 1/1979 | Genrikh et al. | 361/1 |
| 4,190,137 | A | * | 2/1980 | Shimada et al. | 191/27 |
| 4,212,378 | A | * | 7/1980 | Hrovat | 191/62 |
| 4,563,955 | A | * | 1/1986 | Tarassoff | 104/168 |
| 5,720,225 | A | * | 2/1998 | Pugin | 104/123 |
| 6,018,152 | A | * | 1/2000 | Allaire et al. | 219/501 |
| 6,207,939 | B1 | * | 3/2001 | Allaire et al. | 219/600 |
| 6,518,497 | B1 | * | 2/2003 | Allaire et al. | 174/40 R |
| 6,660,934 | B1 | * | 12/2003 | Nourai et al. | 174/40 R |

FOREIGN PATENT DOCUMENTS

| | | | |
|---|---|---|---|
| GB | 2 252 285 A | | 8/1992 |
| JP | 01-097125 A | * | 4/1989 |
| JP | 04-351415 A | * | 7/1992 |
| JP | 06-121438 A | * | 4/1994 |

* cited by examiner

*Primary Examiner*—William H. Mayo, III
(74) *Attorney, Agent, or Firm*—Lathrop & Gagem L.C.

(57) ABSTRACT

Low-frequency AC power in a range of about from 50 to 200 Hz flows through a cableway, providing 5 to 100 watts per meter of cableway. Through separate connections to a power bus, a cableway is electrically divided into branches of a parallel circuit that use low voltage to heat. A transformer connected to each branch transforms high-voltage low amperage current to low-voltage high amperage current.

53 Claims, 5 Drawing Sheets

LOW-FREQUENCY DE-ICING OF CABLEWAYS

RELATED APPLICATIONS

This application claims the benefit of U.S. provisional application Ser. No. 60/263,943, filed Jan. 24, 2001. This application is also a continuation-in-part application of PCT application PCT/US02/01858, filed 22 Jan. 2002. This application is also a continuation-in-part application of commonly-owned and U.S. patent application Ser. No. 09/426,685, filed Oct. 25, 1999 now U.S. Pat. No. 6,563,053, which is a divisional application of U.S. patent application Ser. No. 09/094,779, filed Jun. 15, 1998, now U.S. Pat. No. 6,027,075 on Feb. 22, 2000. This application is also a continuation-in-part application of commonly-owned and U.S. patent application Ser. No. 09/914,817, filed Aug. 31, 2001, now U.S. Pat. No. 6,653,598, which was US national phase application of PCT application PCT/US00/05665, filed 1 Mar. 2000, which claimed the benefit of U.S. provisional application Ser. No. 60/122,463, filed 1 Mar. 1999 (now abandoned) and the benefit of U.S. provisional application Ser. No. 60/131,082, filed 26 Apr. 1999 (now abandone) and which is a continuation-in-part application of commonly-owned and PCT application PCT/US99/28330, filed 30 Nov. 1999, which claims the benefit of U.S. provisional application Ser. No. 60/110,440, filed Dec. 1, 1998 (now abandoned) the benefit of U.S. provisional application Ser. No. 60/122,463 filed Mar. 1, 1999 (now abandoned) and the benefit of U.S. provisional application Ser. No. 60/131,082 filed Apr. 26, 1999 (now abandoned); each of which applications are hereby incorporated by reference.

GOVERNMENT LICENSE RIGHTS

The U.S. Government has certain rights in this invention as provided for by the terms of Grant No. DAAH 04-95-1-0189, awarded by the Army Research Office, and of Grant No. MSS-9302792, awarded by the National Science Foundation.

BACKGROUND OF THE INVENTION

1. Field of the Invention

The invention relates to methods, systems and structures for removing ice from surfaces, in particular, to de-icing cableways and other elongated conductors.

2. Statement of the Problem

The presence of ice on solid surfaces causes various types of problems. For example, excessive ice accumulation on aircraft wings endangers the plane and its passengers. Ice on ship hulls creates navigational difficulties, expenditure of additional power to navigate through water and ice, and unsafe conditions. Icing on power transmission lines adds weight to the power lines, causing power outages, resulting in millions of dollars of direct and indirect damage.

Problems associated with the formation and presence of ice on cableways and other elongated conductors are well known. Cableways, towers and related structures are exposed to wide ranges and varying conditions of temperature, humidity and precipitation that lead to the formation and buildup of ice. Ice interferes with smooth and efficient operation of cableway systems. Ice on cables and associated structures frequently causes expensive damage. More importantly, ice on cableways poses safety risks. Ice and snow deposits on cables and coupling structures can cause system malfunctions while a cableway system is being used to transport people. Heavy accumulations of ice or snow pose risks of cables snapping. Furthermore, deposits of snow and ice that accumulate on cables and other cable-system structures can break off at elevated places, posing a serious risk of falling on people below and injuring them.

SUMMARY OF THE INVENTION

The present invention helps to solve some of the problems mentioned above by providing practical, safe and relatively inexpensive systems and methods for de-icing of elongated objects, in particular, cableways.

In one aspect, a system for de-icing a cableway comprises a power source electrically connected to a cableway or other elongated conductor for heating it. A power source preferably provides AC having a frequency in a range of about from 50 to 200 Hz. In another aspect, the power source provides DC power. In still another aspect, the power source provides power to the cableway in a range of about from 5 to 100 watts per meter of the cableway. In another aspect, a system further comprises a transformer connected to the power source and the cableway.

In another aspect, a cableway or other elongated conductor is electrically divided to form a span that is separately connected to a power source. In still another aspect, a system includes a circuit connection and a plurality of spans, each span having a first end and a second end, wherein the first ends of the spans are electrically connected through the circuit connection to a power terminal of a power source. In another aspect, the circuit connection is switchably connectable to ground. In still another aspect, the second end of the cable spans are electrically connected to to ground. In another aspect, a system in accordance with the invention further includes a plurality of cable spans, each cable span having a first end and a second end, a first power bus connected to a first terminal of a power source, and a second power bus, wherein the first end of a plurality of spans is electrically connected to the first power bus, and the second end of a plurality of spans is electrically connected to the second power bus. In another aspect, the first terminal is a power terminal, and the second power bus is connected to a second terminal of the power source. Preferably, the second power bus is connected to electrical ground. In another aspect, a system further comprises a first end station connected to electrical ground, and a second end station connected to electrical ground, wherein the cableway is connected to electrical ground at the first and second end stations.

In another aspect, in a system in accordance with the invention, a cableway or other elongated conductor comprises a first segment containing at least a first span; and a second segment containing at least a second span, such that the first segment is connected to a power source, and the second segment is connected to a power source separately from the first segment. In another aspect, the first segment is switchably connected to a power source separately from the second segment. In another aspect, a system further includes a first transformer and a second transformer, the first transformer is electrically connected to a power source and the first segment, and the second transformer is electrically connected to a power source and the second segment. In another aspect, a first segment is connected to a first power source in a first circuit, and a second segment is connected to a second power source in a second circuit. In another aspect, a system melts ice using power having a voltage in a range of about from 10 to 20 volts.

In one aspect, a method in accordance with the invention for a cableway or other elongated conductor comprises a step of applying electric power to the elongated conductor for heating it. In another aspect, applying electric power includes separately applying electric power to a span. In still another aspect, applying electric power includes applying electric power to at least one span, and not applying power to at least one other span. In another aspect, applying electric power includes separately applying electric power to a segment. In still another aspect, applying electric power includes applying electric power to at least one segment, and not applying power to at least one other segment. In another aspect, applying electric power includes applying electric power having a voltage in a range of about from 10 to 20 volts to a cable segment. In another aspect, applying electric power includes applying about 5 to 100 W per meter of cableway. In still another aspect, applying electric power includes applying low-frequency AC having a frequency in a range of about from 50 to 200 Hz. In still another aspect, the cableway or elongated conductor has a plurality of spans, and a method further includes electrically connecting the first end of a plurality of spans to a first terminal of a power source, and applying electric power to the plurality of connected spans. In another aspect, a method of further includes electrically connecting the second end of a plurality of spans to electrical ground. In still another aspect, a method further includes applying power to a first transformer that is electrically connected to the elongated conductor, such that the first transformer reduces the voltage and increases the current of the power. In another aspect, a method further includes applying power to the first transformer and a second transformer, the first transformer connected to a first segment containing at least a first span, the second transformer connected to a second segment containing at least a second span. In another aspect, applying electric power comprises applying power from the first power source to a first segment, and applying power from a second power source to a second segment. In still another aspect, applying electric power comprises applying power from the first power source to a first segment, and simultaneously applying power from a second power source to a second segment.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF A PREFERRED EMBODIMENT

The invention includes methods, systems and structures that remove or prevent ice and snow on the surface of an elongated object by providing power to an electrical conductor to melt ice by Joule heating. Although embodiments in accordance with the invention are described below principally with respect to de-icing of cableways, in particular, ski lift cables, it is understood that the invention is useful in many types of applications.

The term "de-icing" is used in a general sense in this specification. It refers to systems and methods for removing ice and snow from elongated objects, in particular, from cableway systems, such as ski lifts, as well as preventing the formation of significant deposits of ice and snow. Throughout this specification, reference is often made to "ice". The term "ice" refers generally to all forms of frozen water, including snow. Similarly, the term "cableway system", "transport system" and related terms refer principally to cableways used for support or movement of chair ski lifts, surface lifts (e.g., skis remain on the ground and are pulled forward), gondolas, aerial tramways, ropeways, funicular railways, cable cars and other cableway systems. Embodiments in accordance with the invention can be used to de-ice the surfaces of other elongated structures, for example, bridges, towers, and cables supporting a bridge, tower, or tent. Generally, elongated structures de-iced in accordance with the invention are electrically conductive, such as electrically conductive, metal ski lift cables. In some embodiments, a nonconductive structure is treated to be electrically conductive, such as through application of a conductive coating. In other embodiments, an electrical conductor is mounted inside or is integral with a cableway or other elongated object. In these embodiments, the cableway or other elongated object may be electrically nonconductive, but the electrical conductor is connectable to a power source in accordance with the invention.

In one aspect, electric power generates Joule heating of a cableway and the Joule heat melts ice or prevents ice formation. In another aspect, DC power is used. In another aspect, AC power is used. Preferably, low-frequency AC power with a conventional commercial frequency, typically in a range of about 50 to 200 Hz, is used. It is understood that AC power having a frequency higher than the frequencies described herein with reference to FIGS. 1–6 may also be utilized in accordance with the invention. An advantage of preferred embodiments discussed herein is that conventional, readily available industrial frequencies are used. Depending on local weather variables, such as wind, temperature and humidity, a heating power in a range of about from 5 to 100 watts per meter of cable ("W/m") heats a cableway above the ice melting point and melts the ice. Typically, heating power of about 25 W/m is suitable. As discussed below, various criteria, such as operating efficiency, equipment costs and personal safety, may be considered in combining voltage and current amplitudes to achieve desired heating power.

Generally, distances and length discussed herein refer to the nominal length of a cableway. For example, a nominal one-kilometer ski lift is one kilometer long from start to finish, from bottom of the lift to the top. Of course, a ski lift cable of a nominal one kilometer ski lift actually has a total stretched-out length of about 2 kilometers, one kilometer moving up, looping around an end station, and then moving down. Therefore, heating calculations usually consider the total stretched-out length. The meaning of the term "cable length" and similar terms in this specification is clear from the context in which they are used.

The terms "connected", "electrically connected" and related terms are used in this specification, and especially in the claims, to indicate that a component of a system is electrically connected, either directly or indirectly through one or more electrical conductors, to another component. The term "electrically connectable" and similar terms indicate that the components are not necessarily electrically connected at all times, but that a switch or some other means is present to close the conduction path between the components and, thereby, effect electrical connection. Thus, the term "switchably connected" and related terms generally indicate that the components are in electrical connection, but that a switch is present in a conduction path, which can be opened to break the connection. Components that are "connected" or "electrically connected" may also be "switchably connected". Thus, the terms "electrically connected", "electrically connectable", "switchably connected" and other related terms are used somewhat interchangeably in the description of embodiments with reference to FIGS. 1–6, and their meaning is clear from the context in which they are used.

In this specification, the term "span" refers to a separate portion of a cableway or other elongated conductor. A span has a length (or size) that is shorter (smaller) than the whole cableway or other elongated conductor. A span includes an electrical connection at each of its two ends. Each end of a span is electrically connected or connectable either to a power source or to electrical ground. In certain embodiments, a span corresponds to a portion of a cableway suspended between two structural supports, with an electrical connection at each support. In other embodiments, however, electrical connections do not correspond to supporting structures. In one aspect, a span in accordance with the invention is "separate" in the sense that it is generally either a separate branch of a parallel circuit, or it is part of a completely separate circuit with its own power source. Thus, the terms "separate", "separately connected" and related terms used with reference to a span indicate that a portion of electric current (and power) can flow through the span without flowing through at least one other portion of the cableway or elongated conductor. A different portion of current, however, may flow through another portion (e.g., another span) of the cableway or elongated conductor. In certain embodiments, an electrical connection can be switched "on" or "off", or an electrical connection can be switched alternatively between a power source and electrical ground. A "segment" of a cableway or other elongated conductor contains one or more spans. A segment is separate in that it is generally either a separate branch of a parallel circuit, or it is part of a completely separate circuit with its own power source. Thus, the terms "separate", "separately connected" and related terms used with reference to a segment indicate that a portion of electric current (and power) can flow through the segment without flowing through at least one other part of the cableway or elongated conductor. A different portion of current, however, may flow through another part (e.g., another segment) of the cableway or elongated conductor. Typically, each span of a plurality of spans included within a segment is an electrically parallel branch of the segment.

Figure 1:
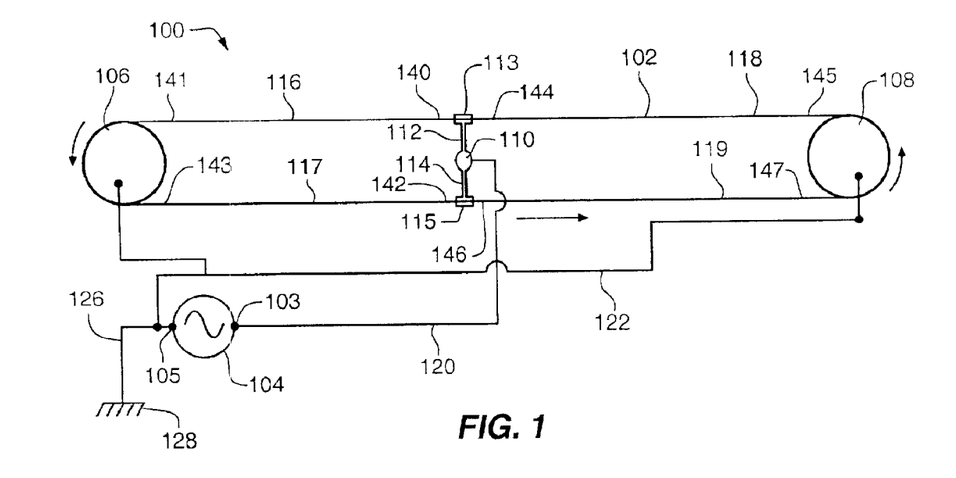
FIG. 1 depicts a low-frequency AC system in accordance with the invention in which a ski lift cable is electrically connected to a low-frequency AC power supply.

A low-frequency AC system 100 in accordance with the invention is depicted in FIG. 1. System 100 includes ski lift cableway 102 in electrical connection with AC power source 104. Ski lift cable 102 typically has a diameter of about 2 cm and typically is manufactured with stainless steel. In a conventional manner, ski lift cable 102 forms a closed loop around a first end station 106 and a second end station 108. Ski lift cableway 102 has a cable length defined by the distance between first end station 106 and second end station 108. Ski lift cableway 102 is supported between end stations 106 and 108 by ski lift tower 110, which has supporting arms 112, 114 with electrical circuit connections 113, 115, respectively. Circuit connections 113, 115 serve to electrically divide ski lift cableway 102 into a plurality of ski lift cable spans 116, 117, 118, 119, each cable span typically having a span length less than the cable length. Cable span 116 has a first end 140 at circuit connection 113 and a second end 141 at first cable station 106; similarly, cable span 117 has a first end 142 at circuit connection 115 and a second end 143 at first end station 106. Cable span 118 has a first end 144 at circuit connection 113 of ski lift tower 110 and a second end 145 at second end station 108; cable span 119 has a first end 146 at circuit connection 115 of ski lift tower 110 and a second end 147 at second end station 108. A first power bus 120 electrically connects a first terminal 103 of AC power source 104 to ski lift cable 102 via circuit connections 113, 115 on ski lift tower 110 and supporting arms 112, 114. A second bus 122 electrically connects a second terminal 105 of AC power source 104 to second end station 108 via conductor 124. First terminal 103 is a power terminal of AC power source 104. Preferably, for safety reasons, second terminal 105 is a ground terminal (but, alternatively, it is a power terminal). First end station 106 and second end station 108 are connected to electrical ground 128 via ground cables second bus 122. Alternatively, second bus 122 is connected to a second power terminal of power source 104. In accordance with one aspect of the invention, AC power source 104 provides low-frequency AC, preferably having conventional industrial frequency, for example, 50 to 200 Hz.

When system 100 is in operation to de-ice ski lift cableway 102, AC current supplied by power source 104 first passes through first power bus 120, preferably an aluminum or copper cable, through central supporting tower 110 and supporting arms 112, 114 to circuit connections 113, 115, into cableway 102, and then goes to electrical ground 128 via bus 122 and conductor 126. Second bus 122 is connected to second terminal 105 of power source 104. Preferably, first power bus 120 and second bus 122 contain aluminum. Because aluminum has much higher conductivity than alloy steel, an aluminum conductor consumes less energy than a steel cable. For example, an aluminum conductor having a typical conductivity value ($\sigma \approx 3.82 \cdot 10^7$ $S \cdot m^{-1}$) and a 2 cm diameter dissipates only about 5% of the heat generated in an iron-nickel stainless steel conductor having the same 2 cm diameter and a conductivity of about $2 \cdot 10^6$ $S \cdot m^{-1}$). Through placement of the power source at the center of the cableway, power loss is further reduced by about 33%.

Figure 2:
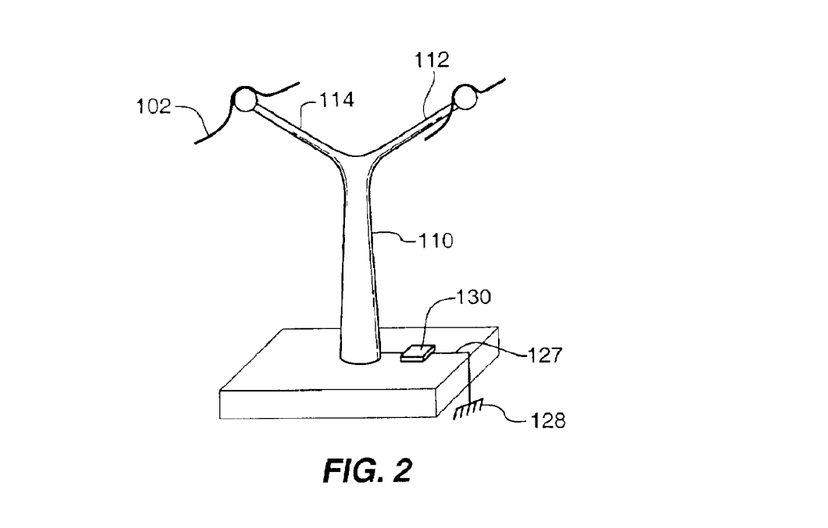
FIG. 2 depicts a tower connected to ground by a ground conductor that is switched "on" and "off" in accordance with the invention by a remotely-controlled switch.

A feature of a preferred embodiment as depicted in FIG. 1 is that end stations 106, 108 are both connected to electrical ground. This feature provides safety advantages because the elements of the de-icing system have zero potential at all times at the end stations, where personnel are likely to come in contact with the system and where the presence of other electrical equipment may require a low-impedance ground connection for safety. Voltage amplitude is highest at circuit connections 113, 115 and at corresponding first ends 140, 142, 144, 146 of cable spans 116, 117, 118, 119, respectively. The voltage decreases toward zero at second ends 141, 143, 145, 147 at end stations 106, 108. In FIG. 1, circuit connections 113, 115 are associated with the ski lift tower 110 and supporting arms 112, 114, which structurally support cableway 102. In other embodiments in accordance with the invention, circuit connections through which a cableway is electrically connected to a power source or ground are associated with other structurally supporting components of a cableway system. In still other embodiments, circuit connections are not associated with any supporting components of a cableway system. In certain embodiments, a structural component serves as part of the electrical connection between a cableway and power source. In still other embodiments, a structural component supporting a cableway or serving some other function is unrelated to electrical connections between a power source and a cableway or other elongated conductor. Ski lift tower 110 in system 100 of FIG. 1 is typically electrically conductive. Notice that even though supporting tower 110 (or other electrically conductive cable-supporting structure) is embedded in earth, this earth connection would unlikely interfere with the de-icing operations because the frozen soil's electrical resistance is many orders of magnitude higher than that of the stainless steel cable. Nevertheless, if desirable for added safety reasons, circuit connections 113, 115 and ski lift tower 110 are switchably connectable to electrical ground 128 by ground conductor 127 through switch 130, as depicted in FIG. 2. Preferably, switch 130 is remotely controlled. When de-icing operation is shut down, switch 130 is switched to ground so that circuit connections 113, 115 and the rest of system 100 are at zero electrical potential. It is contemplated that a de-icing system in accordance with the invention is typically used when ski lift operations are shut down; for example, during the night or early morning before passengers arrive. Nevertheless, a de-icing system and a method in accordance with the invention are also useful during ski lift operations when the use of low voltages or of electric insulation reduces the hazard of a cableway carrying electric current.

EXAMPLE 1

Exemplary calculations were performed for a one-kilometer ski lift cableway 102, as depicted in FIG. 1. The voltage supplied by the AC power source during de-icing operations was calculated as follows:

In a 500-meter span of stainless steel ski lift cable having a 2 cm diameter and an electrical conductance, $\sigma$, of $1.1 \cdot 10^6 S \cdot m^{-1}$, a current of 90 amps with a voltage drop of approximately 0.27 V per one meter length of cable corresponds to 25 W/m of heating power. This corresponds to a voltage drop of 135 V along the 500-meter span. Since there are four spans having a span length of 500 meters, a total current of 360 amps at 135 V, or approximately 50 kW of electric power, is delivered to the ski lift cable. This is usually readily available because such a ski lift usually uses an electric motor having at least 200 kW power. Similar calculations for a cable that is not divided into spans in accordance with the invention show that a voltage drop of approximately 270 V occurs along the 1000-meter length of cable.

Figure 3:
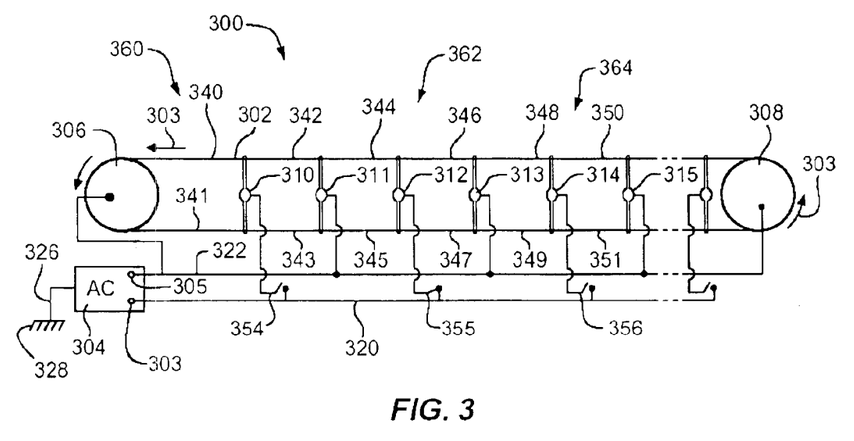
FIG. 3 depicts a low-frequency de-icing system in accordance with the invention having a plurality of ski lift towers in which the ski lift cable is de-iced segment-by-segment using low voltage.
Figure 4:
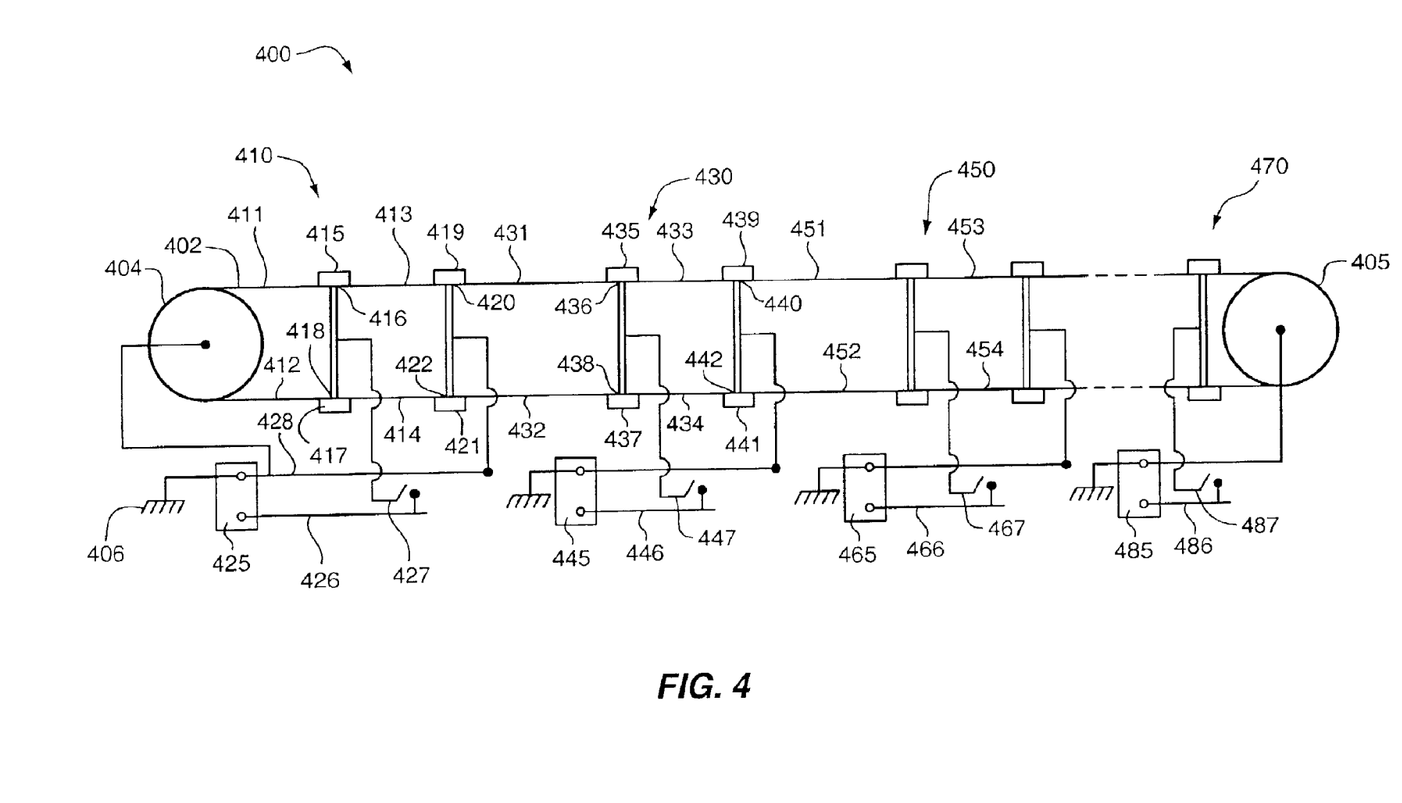
FIG. 4 depicts a system in accordance with the invention including a plurality of power sources, in which individual segments of a cableway are connected to separate power sources.

Typically, a system in accordance with the invention contains a plurality of circuit connections electrically dividing a cableway or other elongated conductor into a plurality of conductor segments. In FIG. 3, a schematical diagram of a ski lift cableway system 300 in accordance with the invention shows a plurality of electrical connection points. Through delivery of power at a plurality of electrical connection points along the cable, a cableway is de-iced at a lower voltage than when power is delivered at one circuit connection, or at one pair of circuit connections as in FIG. 1. System 300 includes ski lift cableway 302 and AC power source 304. Ski lift cableway 302 typically has a diameter of about 2 cm and typically is fabricated with stainless steel. Ski lift cable 302 forms a closed loop around a first end station 306 and a second end station 308, moving in the direction of arrows 303 when operating as a lift. Ski lift cable 302 has a nominal cable length defined by the distance between first end station 306 and second end station 308. First end station 306 and second end station 308 are preferably connected to electrical ground 328. Ski lift cable 302 is supported between electrically-grounded end stations 306 and 308 by a plurality of ski lift towers, including ski lift towers 310, 311, 312, 313, 314, 315. Each tower corresponds to a pair of circuit connections in electrical connection with cableway 302 at respective connection points. A first power bus 320 switchably connects a first terminal 303 of AC power source 304 to circuit connections of ski lift towers 310, 312, 314 through switches 354, 355, 356, respectively. First terminal 303 is a power terminal of AC power source 304. A second bus 322 electrically connects a second terminal 305 of AC power source 304 to circuit connections of ski lift towers 311, 313, 315 and to first and second end stations 306, 308. AC power source 304 is connected to electrical ground via ground cable 326. Ski lift cable 302 includes a plurality of ski lift cable spans disposed between first end station 306 and second end station 308, including among others, cable spans 340, 341, 342, 343, 344, 345, 346, 347, 348, 349, 350, 351. Cable spans 340, 341 are located between first end station 306 and ski lift tower 310 in FIG. 3. Similarly, cable spans 342, 343 are disposed between ski lift towers 310 and 311; cable spans 344, 345 between ski lift towers 311 and 312; cable spans 346, 347 between ski lift towers 312 and 313; cable spans 348, 349 between ski lift towers 313 and 314; cable spans 350, 351 between ski lift towers 314 and 315. Cable span 346 has a first end at ski lift tower 312, and a second end at grounded ski lift tower 313. Cable span 343 has a first end at ski lift tower 310, and a second end at grounded ski lift tower 311. The other cable spans similarly have first and second ends disposed at adjacent ski lift towers (or end stations 306 or 308). The first end of a cable span is located at a powered circuit connection; for example, at ski lift tower 312, which is switchably connected to first power bus 320. The second end of a cable span in system 300 is located at a grounded circuit connection; for example, either at a grounded tower, such as tower 313, or at a grounded end station 306, 308. As depicted in FIG. 3, in system 300, the ski lift towers have two supporting arms, each supporting a span of cable 302 on each side of the towers between first end station 306 and second end station 308. It is understood, however, that ski lift cable 302 can be supported by various arrangements of ski lift towers or other supporting means, without departing from the scope of the invention. It is a feature of certain preferred embodiments in accordance with the invention that electric power is supplied separately to one or a plurality of cable segments, each cable segment including at least one span. For example, in FIG. 3, cable segment 360 includes cable spans 340, 341, 342, 343. Cable segment 362 includes spans 344, 345, 346, 347. Cable segment 364 includes spans 348, 349, 350, 351. As electric power is supplied to system 300 in accordance with the invention, ski lift towers 310, 312, 314 (when simultaneously connected to power source and 304) have a potential corresponding to the voltage of the power source, while grounded ski lift towers 311, 313, 315 and grounded end stations 306, 308 have a potential of zero. As a result, electric power is supplied separately to cable segments 360, 362, 364. Thus, cable segments 360, 362, 364 are electrically connected in parallel to power source 304, each segment forming a separate branch of a parallel circuit. Here, "separate" indicates that a portion of electric power and current flows through one cable segment without flowing through another cable segment. It is clear, however, that in certain embodiments, electric current flows through a power bus connected to a plurality of cable segments before the electric current splits off into the individual segments.

A feature of preferred embodiments in accordance with the invention is that electric power (preferably AC power) is applied separately to a plurality of segments at a corresponding plurality of connection points along the cableway (for example, at the circuit connections associated with ski lift towers 310, 312, 314), rather than to the whole lift cable at one connection point. This reduces the overall voltage used to de-ice a ski lift cable, even when all of the segments of a cable are de-iced simultaneously. For example, six separate 100-meter spans of a cable are simultaneously de-iced at ⅙ the voltage (albeit at the same power) as one 600-meter length of cable. A lower-voltage mode of operation provides safer conditions for people on or near the cableway system.

Through the use of switches, such as switches 354, 355, 356, one or several segments of the ski lift cable are de-iced, while other segments are not simultaneously de-iced. Thus, power is applied to a single connected segment or to a plurality of connected segments, while no electric power is being applied to other segments of the cable. Such separate and "non-simultaneous" deicing of segments and spans of the cable reduces both voltage and power consumption at a given time. For example, segment 362 containing cable spans 344, 345, 346, 347 in FIG. 3 is de-iced when switch 355 is closed, while segments 360 and 364 are not de-iced and do not consume power because switches 354, 356 are open. Thus, in certain preferred embodiments in accordance with the invention, power is supplied at any given time to less than the total number of segments in the system. Reducing the total number of cable segments and spans to which electric power is applied at a given time, or simultaneously, reduces total power levels. Also, limiting heating and de-icing to only ice-covered segments of the ski lift cable, for example, at the top of a mountain, reduces total energy consumption.

It is understood that AC power source 304 may alternatively be followed by a rectifier, which rectifies AC power to DC power. Alternatively, AC power source 304 may be replaced by a DC power source having a similar capacity.

EXAMPLE 2

With reference to FIG. 3, the total distance between cableway stations 306 and 308 is 1000 meters, and cableway 302 is electrically divided into spans having a span length of approximately 50 meters, such that there are 10 segments having a segment length of approximately 100 meters. To provide 25 W/m of heating power to each cable span at a current of 90 amps, AC power having a voltage of 13.5 V is supplied at the first end of each connected span in a segment. Since there are four connected spans per segment, this corresponds to a heating power consumption for one segment of 13.5 V×360 A, or about 5 kW, corresponding to the power of a small gas-powered backup power source. All 10 of the segments can be de-iced simultaneously at 13.5 V with 3700 A, that is, with 50 kW power. This low-voltage mode of operation provides safe conditions for people on or near the ski lift.

Some embodiments, as depicted in FIG. 3, include a single power source for a plurality of separate segments, typically for all of the segments in parallel. Other embodiments in accordance with the invention include a plurality of power sources, each separate power source connected to only one segment or to several segments less than the total number of segments. For example, in system 400 depicted in FIG. 4, some individual segments of cableway 402 are connected to separate power sources. System 400 includes cableway 402, first end station 404 and second end station 405. Cable segment 410 is electrically divided into cable spans 411, 412, 413, 414 by first end station 404 and by circuit connections 415, 417, 419, 421 at connection points 416, 418, 420, 422, respectively. A power terminal of power source 425 is connected via power bus 426 through switch 427 to circuit connections 415, 417. First end station 404 is connected via bus 428 to electrical ground. Typically, bus 428 is a ground cable connected to electrical ground 406 through a ground terminal of power source 425. Circuit connections 419, 421 are electrically connected to electrical ground via bus 428. Paired cable spans 411, 412 each have a first end at connection points 416, 418, respectively, and a second end at electrically grounded first end station 404. Similarly, paired cable spans 413, 414 have a first end at connection points 416, 418, respectively, and a second end at grounded connection points 420, 422, respectively. Connection points 420, 422 are connected to electrical ground through bus 428. Cable segment 430 includes cable spans 431, 432, 433, 434, which are defined by circuit connections 419, 421, 435, 437, 439, 441 at connection points 420, 422, 436, 438, 440, 442, respectively. A power terminal of power source 445 is connected via power bus 446 through switch 447 to circuit connections 435, 437. A second, ground terminal of power source 445 is electrically connected via bus 448 to circuit connections 439, 441. Paired cable spans 431, 432 each have a first end at connection points 436, 438, respectively, and a second end at grounded connection points 420, 422. Similarly, paired cable spans 433, 434 have a first end at connection points 436, 438, respectively, and a second end at grounded connection points 440, 442, respectively. Similarly, segment 450 includes cable spans 451, 452, 453, 454. A power terminal of power source 465 is connected to circuit connections at the first ends of the cable spans through power bus 466 and switch 467. A segment 470 is similarly connected to a power source 485 through power bus 486 and switch 487. Typically, a power source, such as power source 425, 445, 465, 485, is an AC power source providing AC power at conventional industrial frequencies. AC power is useful at virtually any frequency. Alternatively, one or several of power sources 425, 445, 465, 485, is a DC power source. Alternatively, a power source, such as power source 425, 445, 465, 485 includes a rectifier, which rectifies AC power to DC power.

Figure 5:
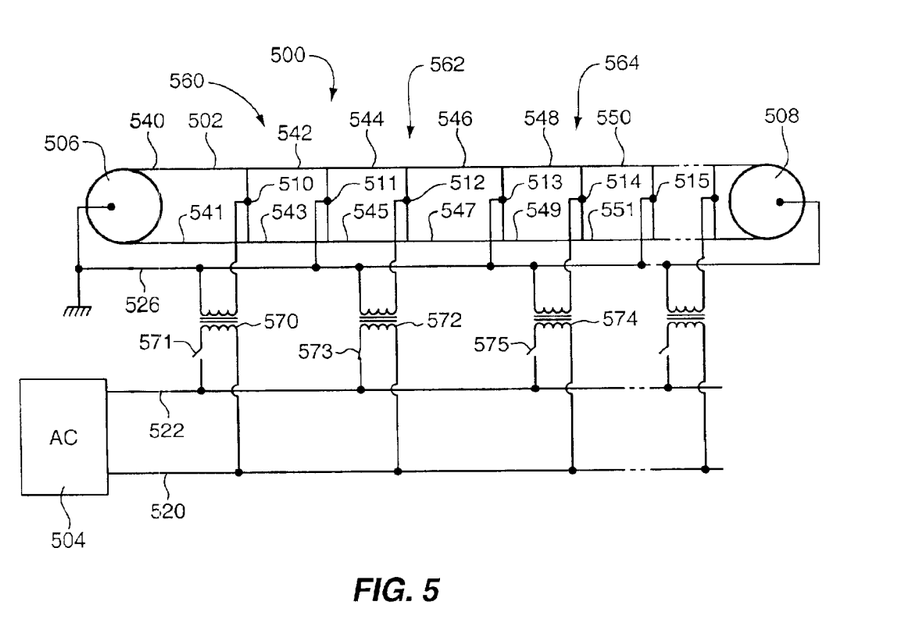
FIG. 5 depicts a system in which a transformer is connected to each segment of a ski lift cable for transforming high-voltage low-current power to low-voltage high-current power in accordance with the invention.

In Example 2, the total current for simultaneous de-icing of all segments at 50 kW and 13.5 V is 3700 A. Relatively large and expensive aluminum or copper bus wires are used to distribute the power. An alternative system 500 is shown in FIG. 5, in which each segment is connected to its own transformer. A transformer transforms higher-voltage lower-current power at the point of use to lower-voltage higher-current power. System 500 includes ski lift cableway 502, and higher-voltage AC power source 504. It also includes first end station 506 and second end station 508 and a plurality of ski lift towers, including ski lift towers 510, 511, 512, 513, 514, 515. A first power bus 520 is connected to one terminal of AC power source 504; a second bus 522 is connected to a second terminal of AC power source 504. First end station 506, second end station 508, and grounded ski lift towers 511, 513, 515 are connected to ground via ground conductor 526. Each of a plurality of ski lift cable spans is defined by circuit connections, which circuit connections are typically located at adjacent ski lift towers (or at a tower and an end station). For example, paired cable spans 544 and 545 each have a first end at ski lift tower 512, and a second end at grounded ski lift tower 511. Similarly, paired cable spans 546 and 547 have a first end at ski lift tower 512 and a second end at ski lift tower 513. Cable spans 544, 545, 546, 547 are included in cable segment 562. Similarly, cable segment 560 includes cable spans 540, 541, 542, 543, and cable segment 564 includes cable spans 548, 549, 550, 551. System 500 includes a power transformer associated with each cable segment. Power transformer 570 connects power bus 520 to cable segment 560 through ski lift tower 510. Similarly, transformers 572, 574 are connected to cable segments 562, 564, respectively. AC power source 504 distributes electric power at a high voltage and low current. Placed electrically between power source 504 and ski lift cable 502, transformers 570, 572, 574 convert the higher voltage power to low-voltage high-current power close to where it is actually used (for example, at each ski lift tower). For example, power source 504 supplies AC power at 480 volts and 100 A to system 500. System 500 has 10 segments in parallel, each segment having a segment length of 100 meters and containing four separate 50-meter cable spans. AC power of 10 amps at 480 volts is distributed to transformer 572, which transforms the higher-voltage power to desired lower-voltage, higher-amperage power near ski lift tower 512 in segment 562; for example, 360 A at 13.5 V. This allows much smaller wire to be used for power distribution, while still using safe, low voltages above ground applied to the ski lift cableway. As depicted in FIG. 5, switches 571, 573, 575 are disposed in the separate electrical circuits corresponding to cable segments 560, 562, 564, respectively. Such switches enable selective "non-simultaneous" heating and de-icing of one or more cable segments, instead of heating all segments of the cable simultaneously. In an alternative embodiment, a system as depicted in FIG. 5 includes a rectifier between each transformer and each circuit connection at towers 510, 512, 514.

Systems and methods in accordance with the invention typically are used for heating and de-icing of cableways when the cableway system is not in operation, for example, during the night. Of course, embodiments of the invention are also useful while the cableway system is being used in normal operation. Preferred embodiments include power sources providing power to a cableway or other elongated conductor at low voltages, for example, in a range of about from 10 to 20 volts. Instead of distributing power to segments either through thick, expensive high-amperage cables or through thin cables connected to a power source at high voltage, a preferred embodiment includes distributing low-current power at high voltage in power buses that may be underground or otherwise hidden, and then transforming the high-voltage power to low-voltage high-current power for use above ground. The low voltage (e.g., 10–20 volts) reduces the risk of injury to persons.

Figure 6:
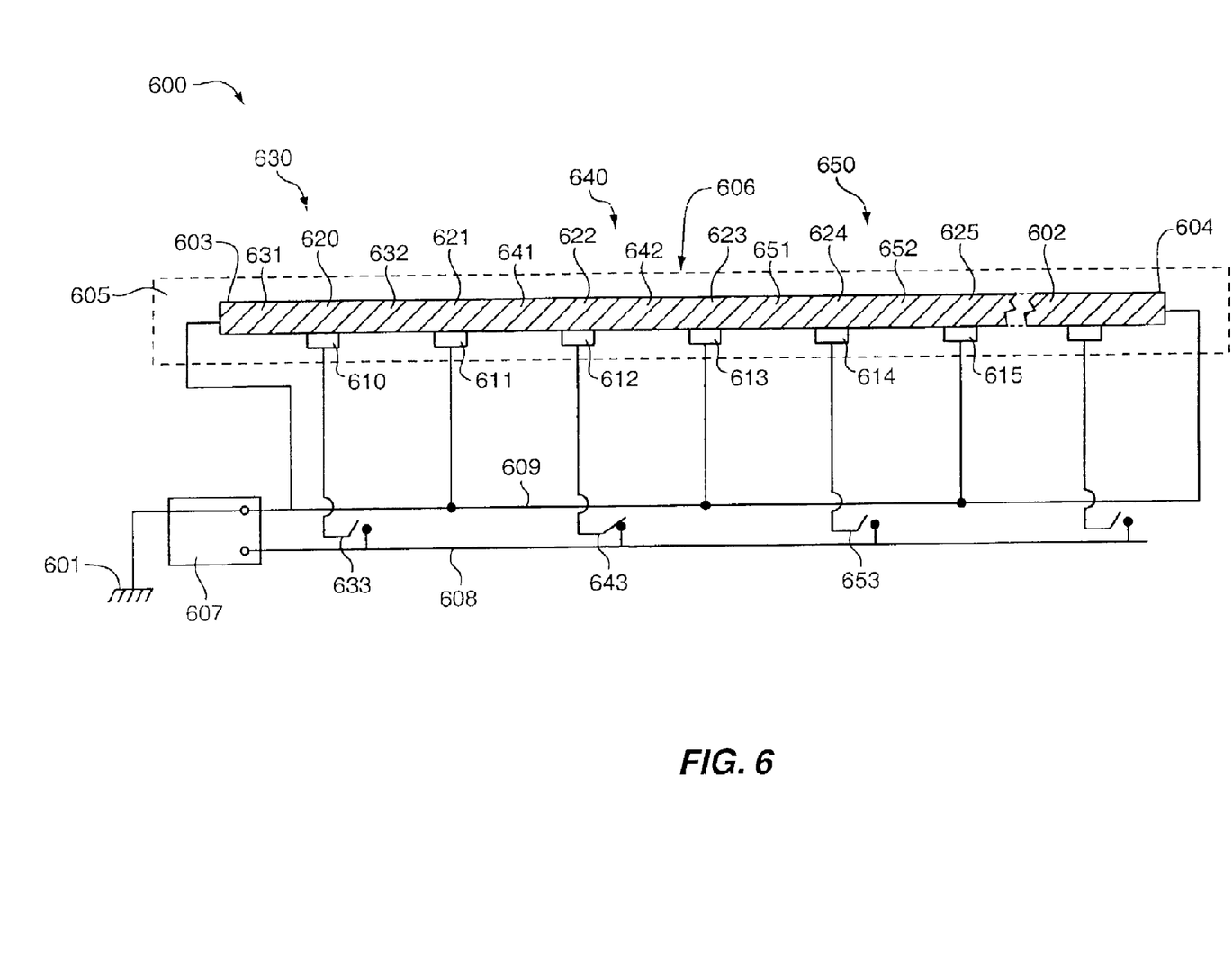
FIG. 6 depicts a generalized system in accordance with the invention circuit in which circuit connections divide an elongated electrical conductor into a plurality of spans and segments for separate heating.

FIG. 6 depicts a generalized system 600 in accordance with the invention. System 600 includes an elongated electrical conductor 602 having a head 603 and a tail 604, which define the conductor length. In certain embodiments, electrical conductor 602 is integral with or mounted in an elongated object 605, indicated by the dashed lines in FIG. 6. In practice, it is important that elongated object 605 (if present) not interfere with the transfer of the Joule heat generated in conductor 602 to the surface 606 being de-iced. The term "elongated object" is, therefore, used interchangeably with the term "elongated conductor" in this specification. System 600 further includes power source 607, which may be an AC power source, an AC power source having a rectifier, or a DC power source. Power bus 608 serves to deliver power from a first terminal of power source 607 to elongated conductor 602. Bus 609 is connected to a second terminal of power source 607. System 600 further includes circuit connections along its length at connection points between head 603 and tail 604. These include circuit connections 610, 611, 612, 613, 614, 615, disposed at connection points 620, 621, 622, 623, 624, 625. Circuit connections electrically divide elongated conductor 602 into a plurality of spans, at least one span having a length less than the conductor length. Elongated conductor 602 is also electrically divided into one or more segments, each segment containing at least one span. At least one segment includes a conductor span having a span length less than the conductor length. As depicted in FIG. 6, system 600 includes segment 630, which includes cable spans 631, 632. A power terminal of power source 607 is switchably connected through power bus 608 and switch 633 to circuit connection 610 at connection point 620. Head 603 and circuit connections 611 are connected through bus 609 either to electrical ground 601 or to a second power terminal of power source 607. Preferably, bus 609 is a ground conductor. Span 631 has a first end at connection location 620 and a second end at head 603. Span 632 has a first end connection location 620 and a second end at connection location 621. Segment 640 includes spans 641, 642. Segment 640 of elongated conductor 602 is switchably connected to power source 607 at connection location 622 through circuit connections 612, switch 643 and power bus 608. Connection location 623 of elongated conductor 602 is connected through circuit connection 613 to bus 609 (preferably to electrical ground). Span 641 has a first end at connection location 622 and a second end at connection location 621. Span 642 has a first end at connection location 622 and a second end at connection location 623, which is electrically connected to bus 609 (preferably to ground). Similarly, segment 650 includes spans 651, 652. Segment 650 of elongated conductor 602 is switchably connected to power source 607 at connection location 624 through circuit connections 614, switch 653 and power bus 608. Connection location 625 of elongated conductor 602 is connected through circuit connection 615 to bus 609 (preferably to electrical ground 601). Span 651 has a first end at connection location 624 and a second end at location 623, which is connected to bus 609 (preferably to ground). Span 652 has a first end at connection location 624 and a second end at connection location 625, which is connected to bus 609 (preferably to electrical ground 601). In accordance with the invention, power is applied to heat elongated conductor 602.

As AC electric power is supplied to system 600 in accordance with the invention, circuit connections 610, 612, 614 and corresponding connection locations 620, 622, 624 (when connected to power bus 608 through switches 633, 643, 653, respectively) have a potential corresponding to the voltage of the power source, while connection locations 621, 623, 625, head 603 and tail 604 have either ground potential or a potential 180 degrees out of phase with potential at connection locations 620, 622, 624. As a result, electric power is supplied "separately" to cable segments 630, 640, 650. Thus, cable segments 630, 640, 650 are electrically connected in parallel, each forming a separate branch of a parallel circuit.

A feature of preferred embodiments in accordance with the invention is that AC power is applied to a plurality of segments separately at a corresponding plurality of connection points along the elongated conductor, rather than to the whole elongated conductor in a single circuit. This reduces the overall voltage used to de-ice an elongated conductor, even when all of the segments are de-iced simultaneously. A low-voltage mode of operation provides safer conditions for people on or near the cableway system.

Through the use of switches, such as switches 633, 643, 653, one or several segments of system 600 are de-iced, while other segments are not simultaneously de-iced. As a result, power is applied to a single connected to segments or a plurality of connected to segments, while no power is being applied to other segments. Such separate and "non-simultaneous" heating of segments and spans of the elongated conductor reduces both voltage and power consumption at a given time. For example, segment 640 containing spans 641, 642 in FIG. 6 is de-iced when switch 643 is closed, while segments 630 and 650 are not de-iced and do not consume power because switches 633, 653 are open. Thus, in certain preferred embodiments in accordance with the invention, power is supplied at any given time to less than the total number of segments in the system. Reducing the total number of segments to which electric power is applied at a given time reduces total power levels. Also, limiting heating and de-icing to only ice-covered segments of elongated conductor 602 or surface 606 reduces total energy consumption. Instead of having a single power source 607 as depicted in FIG. 6, an alternative system similar to 600 includes a plurality of power sources, each power source providing power to one or more segments.

The various embodiments in accordance with the invention provide relatively simple, reliable and inexpensive systems and methods for preventing and removing ice on the surface of an elongated object, in particular, a cableway. Although the embodiments have been described principally with regard to de-icing of ski lifts, the structures and methods herein described are applicable to many types of cableways and other elongated conductors and objects containing conductors. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. For example, although first power bus 120 in FIG. 1 makes electrical connection to ski lift cable 102 through ski lift tower 110, it is clear that electrical connection to ski lift cable 102 can be achieved by other techniques. Consequently, the invention is to be construed as embracing each and every novel feature and novel combination of features present in and/or possessed by the systems, methods and compositions described.

What is claimed is:

1. A system for de-icing a cableway, comprising a cableway configured for movement, and a power source electrically connected to the cableway for heating the cableway, wherein the power source provides power to the cableway in a range of about from 5 to 100 watts per meter of the cableway.

2. A system as in claim 1, wherein the power source provides AC to the cableway.

3. A system as in claim 2, wherein the AC has a frequency in a range of about from 50 to 200 Hz.

4. A system as in claim 1, wherein the power source provides DC power to the cableway.

5. A system as in claim 1, further comprising a transformer connected to the power source and the cableway, whereby the power source provides power having a high voltage, and the transformer is capable of stepping down the high voltage to a low voltage.

6. A system as in claim 1, wherein the cableway comprises a cable span, said cable span being separately connected to a power source.

7. A system as in claim 6, further comprising:
a circuit connection; and
a plurality of cable spans, each cable span having a first end and a second end;
wherein the first ends of the cable spans are electrically connected through the circuit connection to a power terminal of a power source.

8. A system as in claim 7, wherein the circuit connection is switchably connectable to ground.

9. A system as in claim 7, wherein the second end of the cable spans are electrically connected to ground.

10. A system as in claim 6, further comprising:
a plurality of cable spans, each cable span having a first end and a second end;
a first power bus connected to a first terminal of a power source; and
a second power bus;
wherein the first end of the plurality of spans is electrically connected to the first power bus, and the second end of the plurality of spans is electrically connected to the second power bus.

11. A system as in claim 10, wherein the first terminal is a power terminal, and the second power bus is connected to a second terminal of the power source.

12. A system as in claim 10, wherein the second power bus is connected to electrical ground.

13. A system as in claim 1, further comprising:
a first end station connected to electrical ground; and
a second end station connected to electrical ground, wherein the cableway is connected to electrical ground at the first and second end stations.

14. A system as in claim 1, wherein the cableway comprises: a first cable segment containing at least a first cable span; and a second cable segment containing at least a second cable span, the first cable segment connected to a power source, and the second cable segment connected to a power source separately from the first cable segment.

15. A system as in claim 14, wherein the first cable segment is connected to a power source separately from the second cable segment.

16. A system as in claim 1, further comprising a first and a second transformer, and wherein the first transformer is electrically connected to a power source and the first cable segment, and the second transformer is electrically connected to a power source and the second cable segment.

17. A system as in claim 1, further comprising a plurality of power sources, wherein the cableway comprises: a first cable segment containing at least a first cable span, and a second cable segment containing at least a second cable span, the first cable segment is connected to a first power source in a first circuit, and the second cable segment is connected to a second power source in a second circuit.

18. A system as in claim 1, wherein the system melts ice using power having a voltage in a range of about from 10 to 20 volts.

19. A system for de-icing an elongated conductor, comprising:
an elongated conductor; and
a power source electrically connected to the elongated conductor;
wherein the elongated conductor comprises a conductor span, said conductor span being separately connected to a power source, and
wherein the system melts ice using power having a voltage in a range of about from 10to20volts.

20. A system as in claim 19, wherein the power source provides AC to the elongated conductor.

21. A system as in claim 20, wherein AC has a frequency in a range of out from 50 to 200 Hz.

22. A system as in claim 19, wherein the power source provides DC power to the elongated conductor.

23. A system as in claim 19, further comprising a transformer connected to the power source and the elongated conductor, whereby the power source provides power having a high voltage, and the transformer is capable of stepping down the high voltage to a low voltage.

24. A system as in claim 23, further comprising:
a circuit connection; and
a plurality of conductor spans, each conductor span having a first end and a second end;
wherein the first ends of the conductor spans are electrically connected through the circuit connection to a first terminal of a power source.

25. A system as in claim 24, wherein the circuit connection is switchably connectable to ground.

26. A system as in claim 19, further comprising:
a plurality of conductor spans, each conductor span having a first end and a second end;
a first power bus connected to a first terminal of the power source; and
a second power bus;
wherein the first end of a plurality of conductor spans is electrically connected to the first power bus, and the second end of the plurality of conductor spans is electrically connected to the second power bus.

27. A system as in claim 26, wherein the first terminal is a power terminal, and the second power bus is connected to a second terminal of the power source.

28. A system as in claim 26, wherein the second power bus is connected to electrical ground.

29. A system as in claim 19, wherein the elongated conductor comprises: a first conductor segment containing at least a first conductor span; and a second conductor segment containing at least a second conductor span, the first conductor segment connected to a power source, and the second conductor segment connected to a power source separately from the first conductor segment.

30. A system as in claim 29, wherein the first conductor segment is switchably connected to a power source separately from the second conductor segment.

31. A system as in claim 29, further comprising a first transformer and a second transformer, and wherein the first transformer is electrically connected to a power source and the first conductor segment, the second transformer is electrically connected to a power source and the second conductor segment.

32. A system as in claim 31, wherein the first transformer is switchably connected to a power source separately from the second transformer.

33. A system as in claim 19, further comprising:
a plurality of power sources,
wherein the elongated conductor comprises a first conductor segment and a second conductor segment, the first conductor segment is connected to
a first power source in a first circuit, and the second conductor segment is connected to a second power source in a second circuit.

34. A method for de-icing a cableway configured for movement, comprising a step of: applying electric power to the cableway for heating the cableway, wherein applying electrical power comprises having a power source that provides power in a range of about from 5 to 100 watts per meter of the cableway.

35. A method as in claim 34, wherein applying electric power comprises separately applying electric power to a cable span.

36. A method as in claim 35, wherein applying electric power comprises applying electric power to at least one cable span, and not applying power to at least one cable span.

37. A method as in claim 34, wherein applying electric power comprises separately applying electric power to a cable segment.

38. A method as in claim 37, wherein applying electric power comprises applying electric power to at least one cable segment, and not applying power to at least one cable segment.

39. A method as in claim 37, wherein applying electric power comprises applying electric power having a voltage in a range of about from 10 to 20 volts to a cable segment.

40. A method as in claim 34, wherein applying electric power comprises applying low-frequency AC having a frequency in a range of about from 50 to 200 Hz.

41. A method as in claim 34, wherein the cableway has a plurality of spans, and further comprising steps of:
electrically connecting the first end of a plurality of spans to a first terminal of the power source; and
applying electric power to the plurality of connected spans.

42. A method as in claim 41, further comprising:
electrically connecting the second end of a plurality of spans to electrical ground.

43. A method as in claim 34, further comprising:
applying power to a first transformer that is electrically connected to the cableway, such that the first transformer reduces a voltage and increases a current of the power.

44. A method as in claim 43, further comprising:
applying power to the first transformer and a second transformer, the first transformer connected to a first cable segment containing at least a first cable span, the second transformer connected to a second cable segment containing at least a second cable span.

45. A method as in claim 34, wherein applying electric power comprises applying power from the power source to a first cable segment, and applying power from a second power source to a second cable segment.

46. A method as in claim 34, wherein said applying electric power comprises applying power from the power source to a first cable segment, and simultaneously applying power from a second power source to a second cable segment.

47. A method for de-icing an elongated conductor, comprising the steps of:

separately connecting a conductor span with a power source; and applying electric power having a voltage in a range of about from 10 to 20 volts to the conductor span.

48. A method as in claim 47, wherein applying electric power applying electric power simultaneously and separately to a plurality of conductor segments.

49. A method as in claim 47, wherein applying electric power comprises applying electric power to at least one conductor segment, and not applying power to At least one conductor segment.

50. A method as in claim 47, wherein applying electric power comprises applying low-frequency AC having a frequency in a range of about from 50 to 200 Hz.

51. A method as in claim 47, further comprising:

applying power to a first transformer that is electrically connected to the elongated conductor, such that the first transformer reduces a voltage and increases a current of the power.

52. A method as in claim 51, further comprising:

applying power to the first transformer and a second transformer, the first transformer connected to a first conductor segment, the second transformer connected to a second conductor segment.

53. A method as in claim 47, further comprising: applying power from a fast power source to a first conductor segment, and applying power from a second power source to a second conductor segment.

* * * * *